Aug. 13, 1946.    W. J. MILLER    2,405,598
RESILIENTLY SUPPORTED SHEAR BLOCK
Filed June 23, 1944

INVENTOR.
William J. Miller
BY
Fred G. Matheny
ATTORNEY

Patented Aug. 13, 1946

2,405,598

UNITED STATES PATENT OFFICE 2,405,598

RESILIENTLY SUPPORTED SHEAR BLOCK

William J. Miller, Seattle, Wash., assignor to Elliott Bay Mill Co., Seattle, Wash., a corporation of Washington Application June 23, 1944, Serial No. 541,752

5 Claims. (Cl. 164—58)

This invention relates to a shear block or die member for use in cooperation with a reciprocating knife in a veneer clipper or like machine wherein sheet material is being cut.

An object of this invention is to provide a pneumatically supported floating shear block or die member with which a reciproacting knife can cooperate efficiently in the high speed cutting of sheet material without objectionable dulling of the knife.

Another object is to provide a relatively long shear block that is floatingly supported continuously throughout substantially its entire length on an inflated pneumatic tube or air hose.

Another object is to provide a floating shear block or die member of cylindrical shape that is self adjusting in response to the impact of the cutting blows of a reciprocable knife to continuously present a new cutting surface for the knife to cut against.

This floating shear block is well adapted for use in high speed veneer clippers or choppers of the type disclosed in my co-pending patent application Serial No. 484,673, filed Feb. 26, 1943, but this shear block is also suitable for use with other types of clippers.

Further objects of this invention will be apparent from the following description taken in connection with the accompanying drawing.

In the drawing

Like reference numerals designate like parts throughout the several views.

Figure 1:
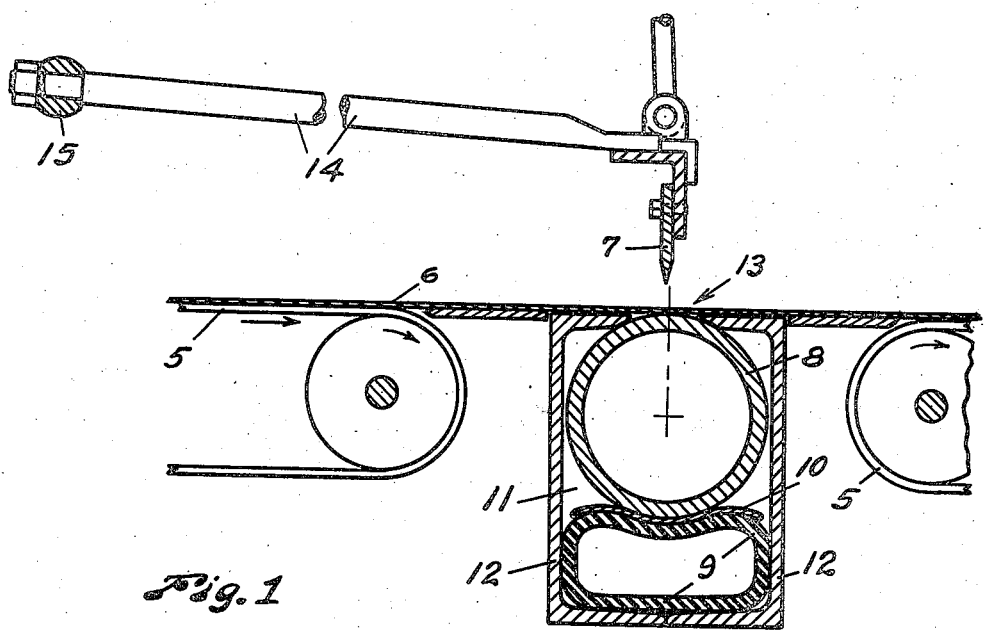
Fig. 1 is a view in cross section showing shear means constructed in accordance with my invention.
Figure 2:
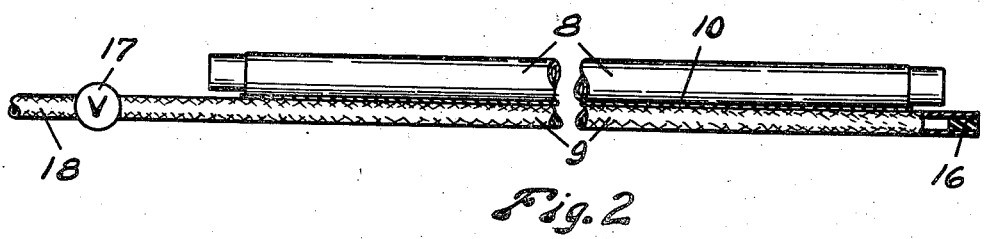
Fig. 2 is a somewhat diagrammatic small scale view in elevation, with parts in section, and showing a pneumatic tube supporting a shear block with a plate interposed therebetween.

The drawing shows veneer clipping or chopping means comprising feed devices 5 over which sheet material, such as a long sheet of veneer 6 is fed past a reciprocable knife 7 by which it is cut into shorter lengths. The shear block or die means comprises a relatively long shear block or die member 8 supported on an inflated tube 9 of resilient or elastic material. Preferably a plate 10 is provided between the shear member 8 and the elastic or pneumatic tube 9.

The shear block 8 may be either tubular or solid and may be made of fairly soft metal or of tough and durable plastic or of any other suitable material that will not objectionably dull the knife. This shear block 8 does not need to be highly resistant to bending or flexing because the pneumatic tube 9 forms a continuous support throughout substantially the entire length of the shear block. Preferably shear block 8 is cylindrical so that it will be self adjusting under the cutting blows of the knife. However said shear block may be of other than cylindrical shape if self adjustment is not desired.

The shear block 8 and elastic tube 9 are supported within a receptacle 11 preferably formed of two channel bars 12 positioned face to face with their flanged sides toward each other, as shown in Fig. 1. The upper flanges of these channel bars 12 are cut away to provide a slot 13 through which a portion of the periphery of the shear block 8 is exposed for the knife 7 to cut against.

The plate 10 is floatingly disposed between shear block 8 and pneumatic tube 9 and shear block 8 can move rotatively on plate 10 without tending to rotate the pneumatic tube 9 in the receptacle 11.

The knife 7 is supported in such a manner that it will not be moving directly toward the center of the shear block 8 when it strikes the same. For this reason and because the shear block 8 is floatingly supported said shear block 8 will be rotatively moved a slight amount by each cutting stroke of the knife. The successive rotative movements imparted to shear block 8 by successive strokes of the knife are relatively small rotative movements but are enough each time to bring into position a new cutting surface for the knife to cut against on its next cutting stroke. These movements vary enough so that usually the knife will strike the shear member 8 in different places on successive revolutions of said shear member. This overcomes all tendency of the knife to make longitudinal grooves in the shear member 8 and causes the wear on said shear member 8 to take place evenly throughout its entire circumference. This insures that there will always be a smooth and even surface for the knife to cut against and at the same time makes possible a maximum useful life for the shear member 8.

The knife 7, shown in the drawing, is supported for movement by arm means 14 that is swingingly movable from a pivot member 15 so that the knife 7 will be moved in an arcuate path and will not be moving directly toward the center of the shear member 8 when said knife strikes a cutting blow. This has been found to produce satisfactory turning movement of the shear member 8. However the same progressive turning movement of the shear member 8 will be produced if the knife is supported for movement in a straight line that is offset to one side of the center of said shear member 8.

Preferably one end portion of the pneumatic tube 9 is hermetically sealed, as by having a plug 16 cemented therein. The other end portion of said pneumatic tube is preferably connected with a valve 17, which in turn, is connected with an air pressure supply hose or conduit 18.

The receptacle 11 is left open at one or both ends and the shear member 8 can be very quickly and easily removed from or inserted in said receptacle from an open end of the receptacle by relieving the air pressure in the pneumatic tube 9. When the pneumatic tube 9 is inflated it will hold the shear member against longitudinal movement in the receptacle 11.

This shear means is particularly well adapted for use in high speed veneer clippers through which the veneer moves constantly and without stopping except when it is stopped by the knife striking it. In such clippers the knife must strike a quick hard blow and be quickly retracted. The pneumatic tube 9 yieldingly supports the shear member 8 throughout the entire length of said shear member and holds said shear member with sufficient force to provide a good clean cut when the knife strikes. At the same time the shear member is yieldingly supported so that the blow of the knife is cushioned and much of the shock of the blow absorbed. Also the yielding support for the shear member provides for the slight turning movement of said shear member at each blow by which a new surface for the knife to cut against is constantly provided. Obviously the air pressure in the resilient tube 9 may be varied in different machines and for different conditions of operation.

The foregoing description and accompanying drawings clearly disclose a preferred embodiment of my invention but it will be understood that this disclosure is merely illustrative and that such changes may be made as are clearly within the scope and spirit of the following claims.

I claim:

1. In apparatus of the class described, a shear block; and a pliable pressure-inflated pneumatic container resiliently supporting said shear block.

2. Shear block means for cooperation with a reciprocating knife; comprising a rotatively supported, cylindrical shear block positioned for the knife to cut against; and pliable pressure-inflated pneumatic container means floatingly and resiliently supporting said cylindrical shear block.

3. In a clipper, resilient shear block supporting means; a cylindrical shear block supported by said resilient shear block supporting means; a knife reciprocable into and out of cutting engagement with said shear block; and means guiding said knife to provide movement of the knife in a direction slightly off center as respects said shear block at the time said knife strikes against said shear block to thereby impart to said shear block a slight rotary movement each time said knife strikes said shear block.

4. In a clipper, frame means having a longitudinal slot therein; a cylindrical shear block rotatively disposed in said frame means and having a portion of its periphery exposed through said slot; resilient means urging said cylindrical shear block toward said slot and into frictional engagement with said frame means; and a reciprocable knife arranged to cut against the exposed peripheral portion of said cylindrical shear block, whereby each blow of said knife will momentarily reduce the frictional engagement of said cylindrical shear block with said frame and thereby release said shear block for turning movement.

5. In a clipper, frame means having a longitudinal slot in one side thereof; a cylindrical shear block rotatively disposed in said frame means and having a portion of its periphery exposed through said slot; a pliable pneumatic tube in said frame means along the side of said shear block opposite said slot, said tube being inflated with air under pressure to provide a resilient support for said shear block; a plate interposed between said cylindrical shear block and said pneumatic tube; and a knife reciprocable into and out of cutting engagement with the peripheral portion of said cylindrical shear block that is exposed through said slot.

WILLIAM J. MILLER.